Patented Aug. 13, 1940

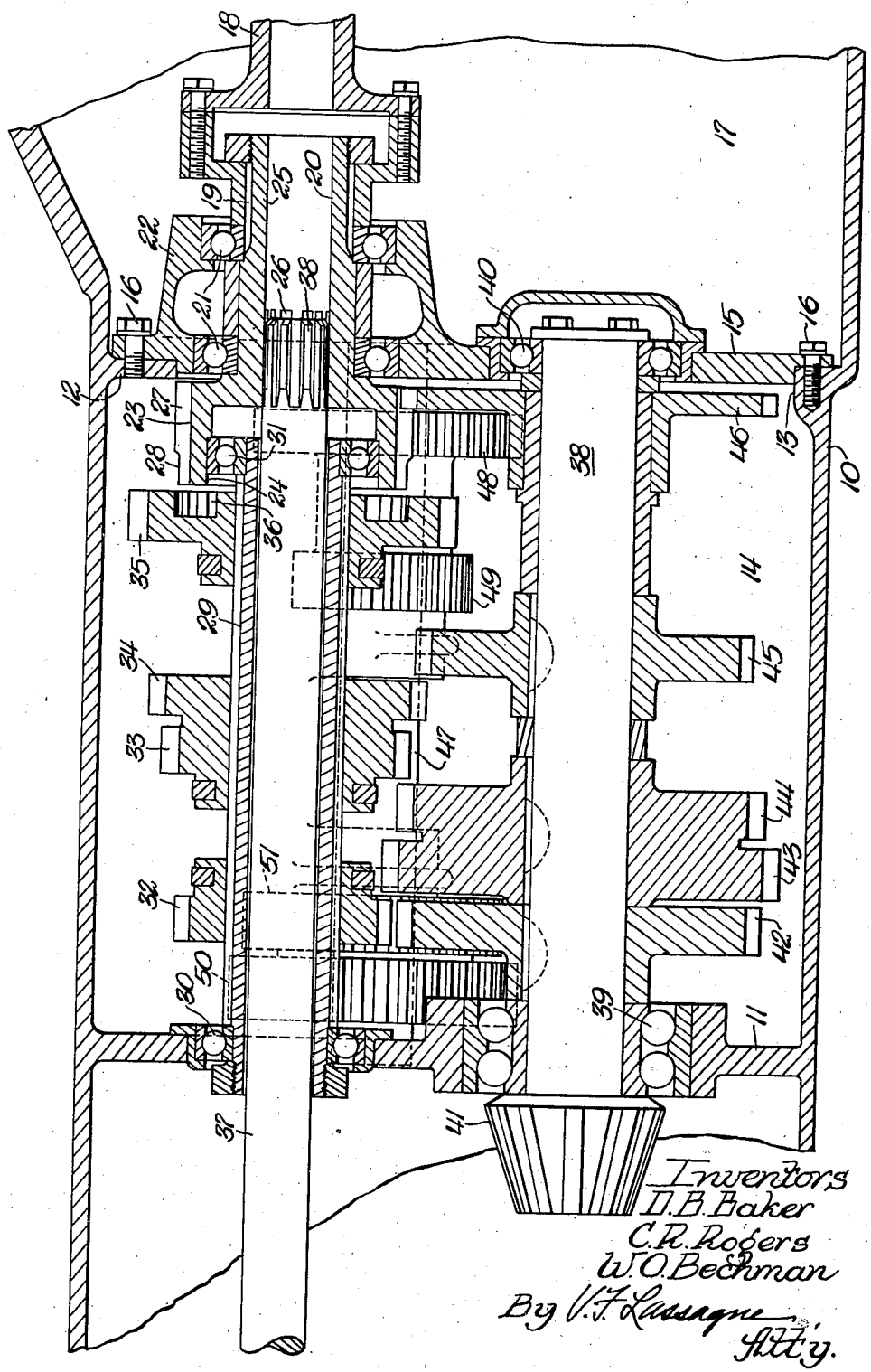

2,210,998

UNITED STATES PATENT OFFICE 2,210,998

POWER TAKE-OFF

David B. Baker, Riverside, Clifford R. Rogers, Oak Park, and William O. Bechman, Chicago, Ill., assignors to International Harvester Company, a corporation of New Jersey Original application September 21, 1936, Serial No. 101,706. Divided and this application December 20, 1937, Serial No. 180,685

6 Claims. (Cl. 74—326)

This invention relates to a power take-off shaft construction for use in a change speed transmission and particularly in a change speed transmission of the multiple range type. This application is a division of applicants' copending application, Serial No. 101,706, filed September 21, 1936.

In the operation of a vehicle having a power take-off shaft, it has been found desirable to provide a power take-off shaft that is capable of uniform operation. The present invention contemplates the provision of a desirable power take-off shaft and transmission assembly that meets the requirements necessary in solving the difficult problems encountered in power take-off constructions.

The principal object of the invention is, then, to provide an improved power take-off shaft construction in a transmission, said shaft being especially adapted to uniform operation independently of the operation of the component parts of the transmission.

An important object of the invention is to provide a power take-off shaft that is continuously rotatable with the engine driven shaft while the change speed gearing of the transmission is in neutral position.

Another important object is to provide a power take-off shaft that may be uncoupled from its connection with the engine shaft without disturbing the transmission mechanism.

Other important objects of the invention will become apparent to those versed in this art as the disclosure is more fully made.

The one figure shown in the drawing is a longitudinal sectional view through so much of the body of a tractor as is necessary to illustrate the transmission mechanism and the improved power take-off shaft construction.

For the sake of illustration, the body of a tractor has been illustrated at 10, the same including a rear integral vertical wall 11 and a front flange 12 provided with a large opening 13, the space 14, thus provided, constituting the change speed gear or transmission mechanism compartment. The front of this compartment and particularly the opening 13 therein is closed by a vertical plate or support 15 removably secured to the flange 12 by means of bolts 16. This portion of the body may thus be spoken of as a transmission housing including longitudinally spaced front and rear walls, forwardly of which is the usual dry clutch compartment 17 wherein is located the usual master or engine clutch, not shown, for connecting or disconnecting to the flywheel of an engine, also not shown, a tubular shaft 18. This shaft 18 is hollow or tubular and includes an internally splined hub 19 which is splined to an extension or driving shaft 20. This shaft is journaled in antifriction bearings 21 carried in the wall or support 15 and in an annular extension 22 formed thereon. The shaft 20 is provided with an enlarged portion 23 extending rearwardly of the wall 15 and this portion is provided with a comparatively large annular recess 24. The forwardly extending portion of the shaft is tubular or hollow, as at 25, and is splined adjacent the annular recess 24, as at 26. It will be apparent, of course, that an axial bore or recess, or their equivalents, could be provided to serve the same purpose as the preferable provision of the hollow portion. The enlarged portion 23 is provided with external gear teeth 27 which are reduced rearwardly as at 28 to provide a clutch means or clutch member.

A hollow or tubular driven or transmission shaft 29 is journaled at its rear end in an antifriction bearing 30 carried in the rear wall 11. The forward end of this shaft extends forwardly within the recess 24 formed in the enlarged end of the drive shaft 20, being journaled therein in an anti-friction bearing 31. The driven shaft carries shiftable transmission gears 32, 33, 34 and 35 for a purpose to appear presently. The shaft 29 also carries for rotation therewith a clutch member which, in the present instance, is formed as an internal gear 36, which forms a clutch means integral with the transmission gear 35. The gear 35 is provided with a shifter fork so that the clutch means or member 36 may be shifted into engagement with the clutch member or means 28 on the driving shaft 20 for conjoint rotation of the two shafts. When the gear 35 is moved to a neutral position as shown in the drawing, the driving shaft 20 is permitted to rotate with the engine without driving the transmission or driven shaft 29.

In order to provide a power take-off shaft that is continuously and uniformly rotatable, independently of the operation of the transmission gearing, a longitudinal shaft 37 is passed through the hollow driven shaft 29. The forward end of this shaft 37 is splined as at 38, being coupled with the splined portion 26 of the driving shaft 20 for rotation therewith. This splined connection permits the shaft 37 to be easily and readily installed and removed without distributing the transmission mechanism. The rear end of the shaft 37 may be supported elsewhere in the tractor body in any suitable manner, not shown.

The following description relates to the transmission mechanism and includes a change speed and power output organization to which the present power take-off shaft construction is especially adapted. A power output shaft 38 is disposed below and parallel to the driven or transmission shaft 29, being journaled at opposite ends in anti-friction bearings 39 and 40 carried in the walls 11 and 15, respectively. At its rear end, the shaft 38 has formed integral therewith a power drive pinion 41 which is adapted to drive final drive gearing, not shown. Rigidly carried by the shaft 38 for rotation therewith within the compartment 14 are a plurality of output gears 42, 43, 44 and 45. These gears are held against axial movement in any suitable manner; and the gears 43 and 44 are preferably formed on one hub. At the forward end of the shaft, an oil pick-up gear 46 is rotatably journaled on a bushing carried by the shaft, said gear meshing and being constantly driven by the gear 27 formed on the enlarged portion 23 of the driving shaft 20.

A counter-shaft 47 is carried by the walls 11 and 15, being disposed parallel to and at one side of the driven shaft 29 and slightly therebelow. A large gear 48 and a smaller gear 49 are loosely carrier on the counter-shaft 47 for rotation with respect thereto. The gear 48 is in constant mesh with the gear 27 and is constantly driven thereby. These gears are preferably formed on a common hub and and are prevented from axial movement in any suitable manner. At the rear end of the counter-shaft and adjacent the forward face of the rear wall 11 are a pair of reverse gears 50 and 51. These gears are also preferably formed from one hub and are carried on the shaft 47 for rotation therewith, being held against axial displacement in any well known manner. This transmission construction is best shown in applicants' co-pending application hereinbefore referred to.

In the operation of the transmission and the power take-off shaft, numerous speed ranges may be obtained from the specific gearing illustrated. These speed changes may be made without interfering with the operation of the power take-off shaft, which is continuously rotatable with the drive shaft 20, as will presently appear. The clutch members 28 and 36 and the gear 35, 48 and 49 provide means for driving the main shaft at two different speed ranges. When the gear 35 is shifted forwardly on the shaft 29, the clutch member or portion 36 thereof is engaged with the clutch member or portion 28 on the enlarged portion 23 of the driving shaft 20. the master or engine clutch, not shown, being disengaged before such operation is effected. This connection of the clutch members establishes a direct drive from the engine through the coupling 18 and the drive shaft 20 to the driven shaft 29.

With the clutch members in the position just referred to, the sliding gears on the shaft 29 may be shifted into any position to engage the power out-put gears or the reverse gears for driving the tractor at a plurality of speeds. When it is desired to operate the tractor in first or low speed, the slidable gear 32 is shifted forwardly into mesh with the power out-put gear 43, first disengaging the master clutch. Without disturbing the relation between the clutch members 28 and 36, second speed may be obtained by shifting the gear 33 rearwardly into engagement with the power out-put gear 34, the gear 32 being at the same time shifted rearwardly and out of engagement with the power out-put gear 43. Similarly, when high speed operation is desired, the slidable gear 34 is shifted forwardly on the shaft 49 and into engagement with the power out-put gear 45, the gear 33 moving forward and out of engagement with the power out-put gear 34.

As previously mentioned, the gears 50 and 51 are reverse gears, the gear 51 being in constant mesh with the power out-put gear 42. When the tractor is operated in any of its forward speeds, the gears 50 and 51 merely rotate idly on the counter-shaft 47. However, when it is desired to operate the tractor in reverse, the gear 32 is shifted rearwardly on the shaft 29 and into mesh with the reverse gear 50, the slidable gears 33 and 34 being thereby moved to a neutral position. With the gears in this position, the gear 32 drives the gears 50 and 51, the gear 51, in turn, driving the power out-put gear 42 in a reverse direction. Thus a complete range in forward and reverse is provided with the clutch members 36 and 28 engaged.

It often becomes desirable to operate the tractor in a lower gear ratio and for that reason, the gears 48 and 49 have been provided. To obtain this lower gear ratio, the gear 35 is moved rearwardly, the master clutch being disengaged, and the clutch members 36 and 28 are disengaged. Continued rearward movement of the gear 35 causes it to engage the gear 49 on the counter-shaft 47, and since the gear 48 is constantly driven by the gear 27, the main shaft 29 is driven at a speed slower than engine speed. With the gear 35 in this position, the above described forward and reverse speed ranges can be obtained by the same shifting operations that effected the speed range in the direct drive ratio. Thus, it will be seen that a plurality of forward and reverse speeds may be obtained in multiple ranges; or in other words, the transmission provides six forward speeds and two reverse speeds. It will be understood, of course, that two separate gear shift levers may be provided for shifting the transmission, one lever for the speed changes and another lever for the ratio changes.

In a transmission of this type, it is desirable that the power take-off shaft or source be not subjected to operation in various speed ranges, it being more desirable to have uniform rotation of the power take-off source. The power take-off shaft construction hereinbefore referred to is especially adapted to meeting these requirements. By being directly connected to the driving shaft 20, the shaft 37 always rotates at one speed, as long as the master clutch is engaged with the engine flywheel. It will be noted that with this construction, disengagement of the clutch members 28 and 36 or shifting of the slidable gears 32, 33 and 34 do not in any way interfere with the uniform operation of the power take-off source 37. It will be also noted that in the event it becomes desirable or necessary to remove the shaft 37, this shaft may be removed without interfering with the structure or operation of the transmission gearing. To remove the shaft 37, it is necessary merely to disconnect its rearward support, which may be of any suitable construction, not shown, and to draw the shaft axially rearwardly through the driven shaft 29. The splined connection 26—38 provides an ideal coupling means for adapting the connection to easy installation and removal.

It will be noted from an examination of the drawing, that the anti-friction bearings 21 and 31 and the splined connection 26—38 are disposed with respect to the support or wall 15 in a manner providing for utmost structural strength and for ease in disassembly. It will be particularly apparent, from the location of the splined connection 26—38, that said connection is located in the immediate vicinity of the common plane of the wall 15 and the rear bearing 21. This construction is desirable in providing a comparatively rigid, torque resisting support.

Other advantages of the preferred construction illustrated will be apparent to those skilled in the art, and it will be appreciated that numerous alterations and modifications of the structure may be made without departing from the spirit and scope of the invention as defined in the appended claims.

What is claimed is:

1. A power take-off shaft and transmission assembly comprising a support, a hollow driving shaft clutch-connected to a source of power and journaled in the support, a coaxial hollow driven shaft having an end journaled in an end of the driving shaft in the vicinity of the support, a clutch member on each shaft adapted to be engaged for connecting the shafts for conjoint rotation, transmission gearing carried by the driven shaft, and a longitudinal shaft passed loosely through the driven shaft and removably connected to the driving shaft for continuous rotation therewith independently of rotation of the driven shaft and transmission gearing, said longitudinal shaft being substantially of a uniform diameter less than the inside diameter of the hollow driven shaft and being thereby removable independently of said driven shaft and in a direction away from the driving shaft, said longitudinal shaft having its unconnected end extending beyond the driven shaft and transmission gearing and constituting a power take-off.

2. A power take-off shaft and a transmission assembly comprising a housing having a transverse support, a driving shaft clutch-connected to a source of power and journaled in said support and having an enlarged portion disposed rearwardly of the support, said portion being formed with an annular recess, said shaft being further formed with a smaller coaxial recess, a hollow driven shaft coaxially disposed and having its forward end journaled in the driving shaft in the annular recess, clutch means on the enlarged portion of the driving shaft, clutch means on the driven shaft, said clutch means adapted to be engaged for connecting the shafts for conjoint rotation, transmission gearing carried by the driven shaft, and a longitudinal shaft passed loosely through the driven shaft and fitted into the smaller recess of the driving shaft for continuous rotation therewith independently of the driven shaft and the transmission gearing, said longitudinal shaft being substantially of a uniform diameter less than the inside diameter of the hollow driven shaft and being thereby removable independently of said driven shaft and in a direction away from the driving shaft.

3. A power take-off shaft and transmission assembly comprising a housing having a pair of longitudinally spaced front and rear walls, a driving shaft clutch-connected to a source of power and journaled in the front wall and being formed with an enlarged portion disposed rearwardly of said wall, said portion being provided with an annular recess, said shaft being further provided with a coaxial splined bore adjacent the recess, a hollow driven shaft disposed coaxial with the driving shaft and having its forward end extending within the annular recess in the driving shaft adjacent the front wall, said driven shaft being journaled at its rear end in the rear wall, clutch means on the enlarged portion of the driving shaft, clutch means carried by the driven shaft, said clutch means adapted to be interconnected for conjoint rotation of the shafts, and a longitudinal shaft passed loosely through the driven shaft, said longitudinal shaft being splined at its forward end and fitted into the splined bore in the driving shaft for continuous rotation therewith independently of rotation of the driven shaft, said longitudinal shaft being substantially of a uniform diameter less than the inside diameter of the hollow driven shaft and being thereby removable independently of said driven shaft and in a direction away from the driving shaft, said longitudinal shaft extending rearwardly of the aforesaid rear wall and constituting a power take-off.

4. A power take-off and transmission assembly comprising a support, a driving shaft clutch-connected to a source of power and formed with a recess at one end, a hollow driven shaft, said shafts being disposed coaxially and one of said shafts being journaled in the support, a clutch member on each shaft adapted to be engaged for connecting said shafts for conjoint rotation, transmission gearing carried by the driven shaft, and a longitudinal shaft passed loosely through the driven shaft and fitted into the recess in the driving shaft for continuous rotation therewith independently of rotation of the driven shaft and the transmission gearing and constituting a power take-off, said longitudinal shaft being substantially of a uniform diameter less than the inside diameter of the hollow driven shaft and being thereby removable independently of said driven shaft and in a direction away from the driving shaft.

5. A power take-off shaft and transmission assembly comprising a transverse support, a driving shaft clutch-connected to a source of power and journaled in and extending rearwardly of the support and having an annular recess formed in the rear end thereof, a coaxial driven shaft journaled in said recess rearwardly of the support, disconnectable means for connecting said shafts for conjoint rotation, transmission gearing on the driven shaft, and a longitudinal shaft passed through the driven shaft and having its forward end coupled to the driving shaft substantially in the immediate vicinity of the plane of the support, said longitudinal shaft constituting a power take-off continuously operable with the driving shaft independently of the operation of the disconnectable means, the driven shaft and the transmission gearing.

6. A power take-off shaft and transmission assembly comprising a transverse support, an anti-friction bearing carried in the support substantially within the transverse plane thereof, a driving shaft clutch-connected to a source of power and journaled in and extending rearwardly of said bearing and having an annular recess formed in the rear end thereof, a co-axial driven shaft journaled at one end in said recess rearwardly of the support, disconnectable means for connecting said shafts for conjoint rotation, transmission gearing on the driven shaft, and a longitudinal shaft having its forward end coupled to the drive shaft substantially in the immediate vicinity of the common transverse plane of the support and the aforesaid bearing, said longitudinal shaft constituting a power take-off shaft continuously operable independently of the operation of the disconnectable means, the driven shaft and the transmission gearing.

DAVID B. BAKER.
CLIFFORD R. ROGERS.
WILLIAM O. BECHMAN.